United States Patent
Bourennane

(10) Patent No.: US 7,168,752 B2
(45) Date of Patent: Jan. 30, 2007

(54) FASTENER MEANS FOR FASTENING A CLOSURE HATCH TO A BODYWORK PART

(75) Inventor: Faicel Bourennane, Amberieu en Bugey (FR)

(73) Assignee: Compagnie Platic Omnium, Lyons (FR)

( * ) Notice: Subject to any disclaimer, the term of this patent is extended or adjusted under 35 U.S.C. 154(b) by 0 days.

(21) Appl. No.: 10/542,389

(22) PCT Filed: Mar. 18, 2005

(86) PCT No.: PCT/FR2005/000669
§ 371 (c)(1),
(2), (4) Date: Jul. 14, 2005

(87) PCT Pub. No.: WO2005/097571

PCT Pub. Date: Oct. 20, 2005

(65) Prior Publication Data
US 2006/0048453 A1    Mar. 9, 2006

(30) Foreign Application Priority Data
Mar. 18, 2004  (FR) .................................. 04 02828

(51) Int. Cl.
*B50J 1/08* (2006.01)
(52) U.S. Cl. ............................... 296/146.1; 15/250.02; 239/284.2
(58) Field of Classification Search ............ 296/146.1; 293/117; 15/250.02; 239/284.2
See application file for complete search history.

(56) References Cited

U.S. PATENT DOCUMENTS

| 3,456,278 | A | * | 7/1969 | Kibler el al. | ............ | 15/250.02 |
| 3,736,617 | A | * | 6/1973 | Ahlen | .................... | 15/250.002 |
| 3,939,523 | A | * | 2/1976 | Kolbe et al. | ........... | 15/250.002 |
| 4,368,505 | A | * | 1/1983 | Tomforde | ................. | 239/284.2 |
| 5,769,528 | A | * | 6/1998 | Dinant | ..................... | 239/284.2 |
| 5,975,431 | A | * | 11/1999 | Harita et al. | ................... | 15/322 |
| 6,296,198 | B1 | * | 10/2001 | Tores | ..................... | 239/284.2 |
| 6,739,521 | B2 | * | 5/2004 | Bandemer et al. | ...... | 15/250.002 |

FOREIGN PATENT DOCUMENTS

| EP | 1 125 808 A2 | 8/2001 |
| WO | WO/01/12482 | 2/2001 |

* cited by examiner

Primary Examiner—Kiran B. Patel
(74) Attorney, Agent, or Firm—Robert L. Epstein; Epstein Drangel Bazerman & James, LLP

(57) ABSTRACT

The invention relates to fastener means for fastening a closure hatch to a bodywork part for the purpose of closing an opening which is provided in said bodywork part and from which a moving member can be caused to project, the closure hatch being provided with assembly means which serve to assemble it to the moving member. The fastener means include assembly means suitable for co-operating with the assembly means of the hatch for the purpose of securing the hatch to said fastener means, and securing means for securing said fastener means to the bodywork part. The invention also relates to an assembly comprising a hatch and such fastener means.

16 Claims, 4 Drawing Sheets

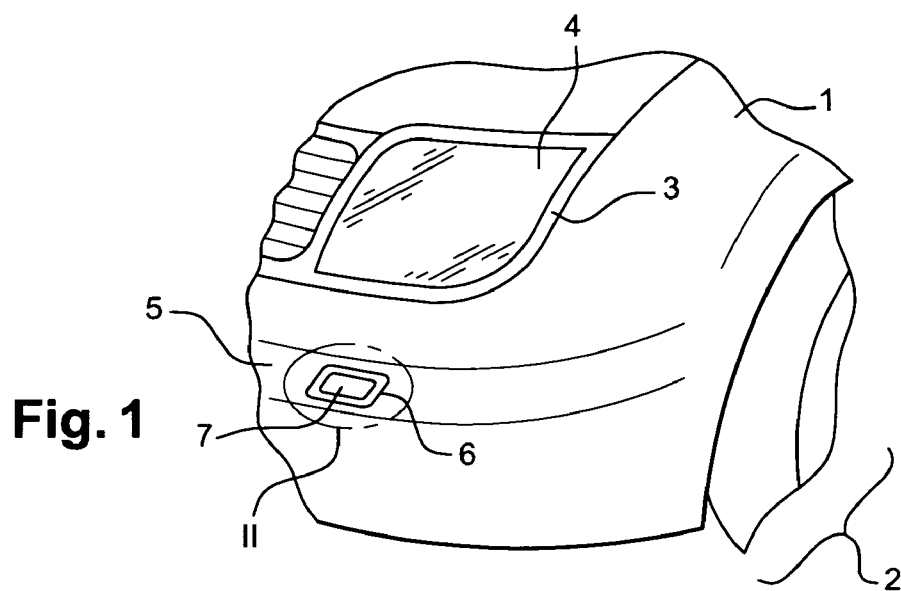
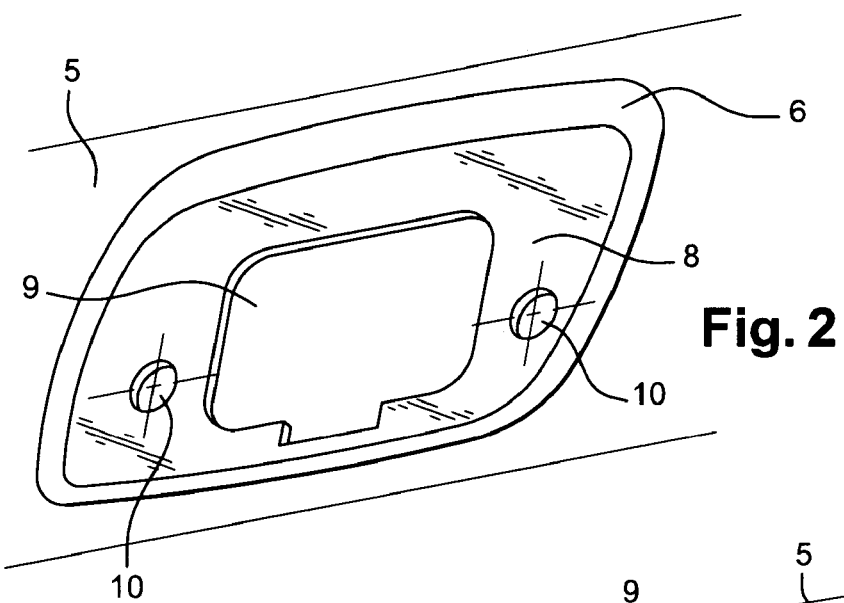
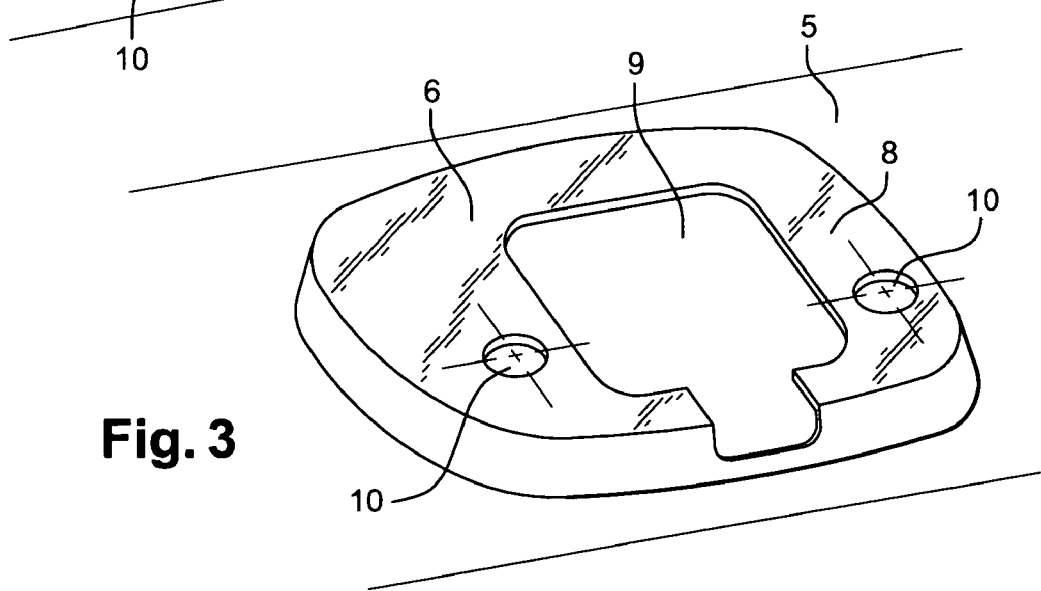

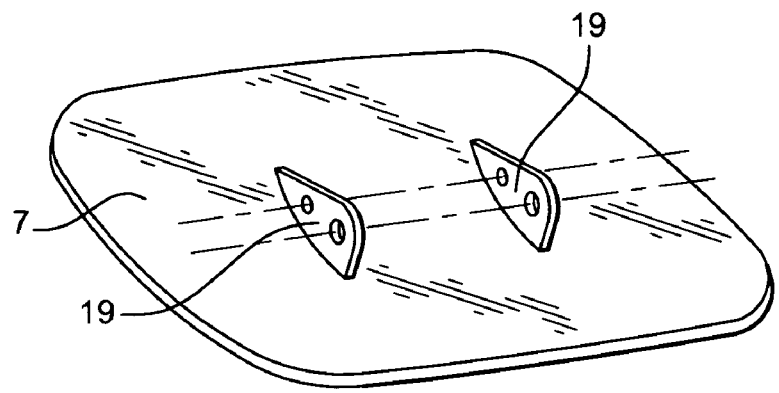
Fig. 4
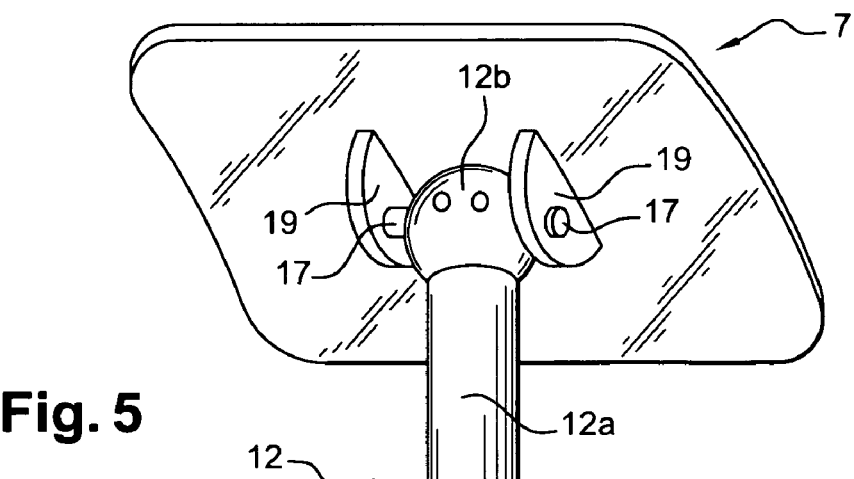
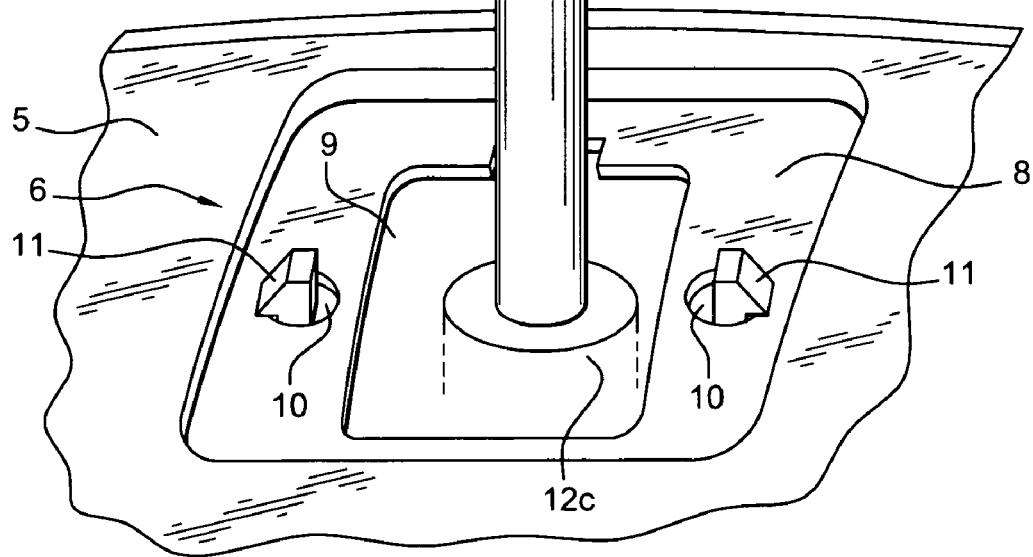
Fig. 5

FASTENER MEANS FOR FASTENING A CLOSURE HATCH TO A BODYWORK PART

The present invention relates to: fastener means for fastening a closure hatch to a bodywork part for the purpose of closing an opening which is provided in said bodywork part and from which a moving member can be caused to project; to an assembly comprising a closure hatch and such fastener means; and to an assembly comprising a bodywork part, a closure hatch, a headlight washer nozzle, and means for fastening the hatch.

BACKGROUND OF THE INVENTION

Headlight washer devices are known that are members mounted close to the headlights of a vehicle for the purpose of spraying the glasses of the headlights with water or with a cleaning mixture.

For esthetic reasons and for providing protection from dirt, the headlight washer device is often received behind the bumper skin and is mounted to move between two positions, namely a "rest" position in which the headlight washer device is retracted inside the bumper skin, and an "in-use" position in which the headlight washer device projects from the bumper skin through an opening provided therein, the nozzle of the headlight washer device being directed towards the headlight glass.

In which case, the presence of the headlight washer device requires an opening to be provided in the bumper skin, as well as a moving hatch mechanism for closing said opening when the headlight washer device is at rest, and for uncovering said opening when the headlight washer device is in the "in-use" position.

Thus, the closure hatch is equipped with assembly means for assembling it to the moving member constituted by the headlight washer device, thereby constraining the hatch to move with the moving member between a closed position in which it closes the opening, while the moving member is retracted inside the opening, and an open position in which it uncovers the opening, while the moving member is projecting from said opening.

However, since headlight washer devices are currently items of equipment that are optional, or that are standard features on top-range vehicles only, a solution has already been devised for a vehicle model (the Astra (registered trademark) model manufactured by the car maker Opel (registered trademark) that was put on the market in 2004), whereby a same bumper skin can be used interchangeably either with or without headlight washer devices. That solution offers the advantage of avoiding having to manage two categories of bumper skin: bumper skins provided with an opening for installing headlight washer devices, and bumper skins that are not provided with such an opening.

In that solution, the bumper skin is always provided with an opening that is closed by a hatch, but, in the absence of headlight washer device on the vehicle, the hatch is snap-fastened directly onto the bodywork part by snap-fastening catches.

The result is satisfactory as regards manufacture of the bumper skins, but could still be improved from an industrial point of view because the presence of snap-fastening catches on the hatch hinders the movements of the moving member. It is thus necessary to re-machine or otherwise re-work each hatch before equipping a vehicle provided with a headlight washer device, in order to remove the snap-fastening catches and in order to enable the moving member to be fastened to the hatch.

OBJECTS AND SUMMARY OF THE INVENTION

An object of the present invention is to remedy that drawback.

The present invention thus provides fastener means for fastening a closure hatch to a bodywork part for the purpose of closing an opening which is provided in said bodywork part and from which a moving member constituted by a headlight washer nozzle can be caused to project, the closure hatch being provided with assembly means which serve to assemble it to the moving member, thereby constraining the hatch to move with the moving member between a closed position in which said hatch closes the opening while the moving member is retracted inside the opening, and an open position in which it uncovers the opening while the moving member is projecting from said opening. Said fastener means include assembly means suitable for co-operating with the assembly means of the hatch for the purpose of securing the hatch to said fastener means, and securing means for securing said fastener means to the bodywork part, the fastener means holding the hatch on the bodywork part in the absence of the moving member.

By means of the invention, it is no longer necessary to re-machine or otherwise re-work the hatch depending on whether or not the vehicle on which it is to be used is equipped with headlight washer devices, since the assembly means provided on said hatch can serve equally well to fasten it to the moving member, i.e. in particular the headlight washer device, or to fasten it to the fastener means that hold it on the skin in the absence of such a moving member.

In particular embodiments, the invention may have one or more of the following characteristics taken alone or in combination:

The fastener means are constituted by a tie provided with the assembly means for being secured to the hatch, and by a support provided with the securing means for being secured to the bodywork part, the tie and the support being provided with coupling means arranged in a manner such that the tie transmits to the support the forces necessary for holding the hatch in the closed position. Subdividing the fastener means into two parts facilitates mounting said fastener means between the hatch and the bodywork part. In particular, as explained below, such subdivision facilitates sandwiching the bodywork part between the fastener means and the hatch, and generating a force for pressing the hatch into the recess that is reserved for it in the bodywork part, so that any play that might appear subsequently to the hatch being put in place for the first time is automatically taken up.

The hatch is shaped to bear against an outside face of the bodywork part when said hatch is in the closed position, and the fastener means bear against a face of the bodywork part that is opposite from its outside face. Thus the bodywork part is sandwiched so that the reaction force necessary for applying a pressing force is transmitted directly to the surface via which the fastener means bear against the bodywork part.

The fastener means are dimensioned in a manner such as to exert on the hatch a force pressing it against the outside face of the bodywork part.

The fastener means present elasticity in a direction substantially normal to the bodywork part in the vicinity of the opening, to an extent corresponding to any play that might result from expansion of the fastener means and possibly from expansion of the hatch and/or of the bodywork part and/or corresponding to creep in any of these items.

The elasticity of the fastener means is procured by an elastically-deformable portion of the support.

The elastically-deformable portion of the support supports the coupling means for coupling to the tie.

The coupling means comprise a ball coupling that enables the tie to hold the hatch in the opening without requiring it to be in any particular angular position.

The ball coupling is constituted by a spherical portion on the tie and by a frustoconical seat on the support.

The support and the tie are provided with a guide shape enabling them to couple together.

The guide shape comprises an engagement ramp whose inclination is such that, during the coupling, the tie moves closer to the support, thereby generating the force for pressing the hatch against the outside face of the bodywork part.

The guide shape further comprises non-return abutments for opposing uncoupling of the tie from the support.

The tie is provided with bearing surfaces arranged both to slide over the engagement ramp and to force past the non-return abutments.

The hatch is dimensioned to be suitable for being received in the thickness of the bodywork part when it closes the opening therein.

The assembly means for assembling the hatch to the moving member and to the fastener means comprise fastener ribs suitable for co-operating with studs formed on the moving member and with studs formed on the fastener means.

The present invention also provides an assembly comprising a hatch and fastener means as described above for fastening said hatch.

In the invention the bodywork part may, in particular, be a bumper skin.

The invention also provides an assembly comprising a bodywork part, a moving member constituted by a headlight washer nozzle, a closure hatch for closing an opening which is provided in said bodywork part and from which the headlight washer nozzle can be caused to project, and fastener means for fastening the hatch to the bodywork part, in which assembly the closure hatch is provided with assembly means which serve to assemble it to the nozzle, thereby constraining the hatch to move with the nozzle between a closed position in which said hatch closes the opening while the nozzle is retracted inside the opening, and an open position in which it uncovers the opening while the nozzle is projecting from said opening, wherein the fastener means include assembly means suitable for co-operating with the assembly means of the hatch for the purpose of securing the hatch to said fastener means, and securing means for securing said fastener means to the bodywork part, the fastener means holding the hatch on the bodywork part in the absence of the nozzle.

BRIEF DESCRIPTION OF THE DRAWINGS

In order to enable the invention to be better understood, a description follows of an embodiment given by way of non-limiting example, with reference to the accompanying drawings, in which:

FIG. 1 is a three-quarter perspective view of a left front end of a motor vehicle, provided with a shield and with a closure hatch;

FIG. 2 is an enlargement of the front of the shield of FIG. 1, in a portion II thereof;

FIG. 3 is a rear view of the same portion II of the shield;

FIG. 4 is perspective view from below of the closure hatch of FIG. 1;

FIG. 5 is a perspective view of a headlight washer nozzle in the deployed position;

MORE DETAILED DESCRIPTION

Figure 6:
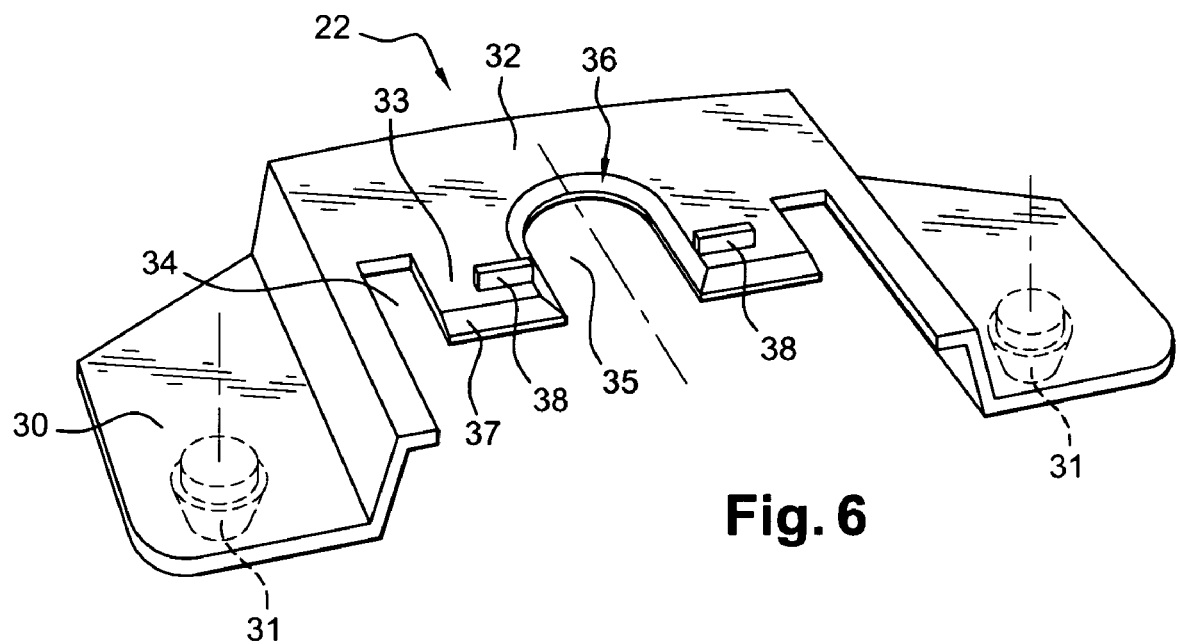
FIG. 6 is a perspective view of a support that is part of the means for fastening the hatch.

FIG. 1 shows a bumper skin 1 which, in the vicinity of its overrider 2, is provided with a setback 3 for a headlight unit 4.

The bumper skin 1 has a top edge 5 which is substantially horizontal, and in which an opening 6 is provided that is situated at the base of the headlight unit.

The opening 6 makes it possible for a headlight washer device (not shown in FIG. 1 but whose nozzle 12 is visible in FIG. 5) to project above the edge 5 for the purpose of spraying a cleaning liquid onto the glass of the headlight unit 4.

In FIG. 1, the opening 6 is closed by a hatch 7 of corresponding shape.

In the close-up view of FIG. 2, the inside of the opening 6 can be seen in more detail.

The opening is dish-shaped with a bottom 8 in the middle of which a substantially rectangular passageway 9 is provided that is dimensioned to enable the headlight washer nozzle (not shown) to pass through.

On either side of the opening 9, two orifices 10 or "clip holes" make it possible to snap-fasten the body 12c of the nozzle, which body is provided with two snap-fastener catches 11 for that purpose, as can be seen in FIG. 5.

Centering ribs and shoulders (not shown) are formed in the thickness of the opening for the purpose of centering the hatch 7 and of adjusting it to be flush with the edge 5 of the bumper skin.

The hatch 7, which is shown in particular in FIG. 4, is of thickness such that by bearing against the shoulders of the opening 6, the hatch is positioned to be flush with the edge 5.

When the hatch is in the "closed" position shown in FIG. 1, there are two possibilities. Either the vehicle does not have a headlight washer device and the hatch is set permanently in this closed position, or else the vehicle does have a headlight washer device, in which case the hatch takes up this closed position when the headlight washer device is at rest, retracted into the bumper skin.

As can be seen in FIG. 5, the hatch is secured to the headlight washer device by assembly means comprising two fastener ribs 19 suitable for co-operating with studs 17 formed on the head of the nozzle 12. The hatch 7 is pressed against the shoulders when the head of the nozzle is retracted into the rest position, which gives the bumper skin the appearance shown in FIG. 1.

When the nozzle head is in its in-use position, as shown in FIG. 5, the hatch is raised above the opening 6, and the nozzle head 12b can spray a cleaning liquid onto the glass of the headlight unit 4.

There follows a description of the fastener means for fastening the hatch to the bumper skin when the vehicle does not have any headlight washer device.

Figure 7:
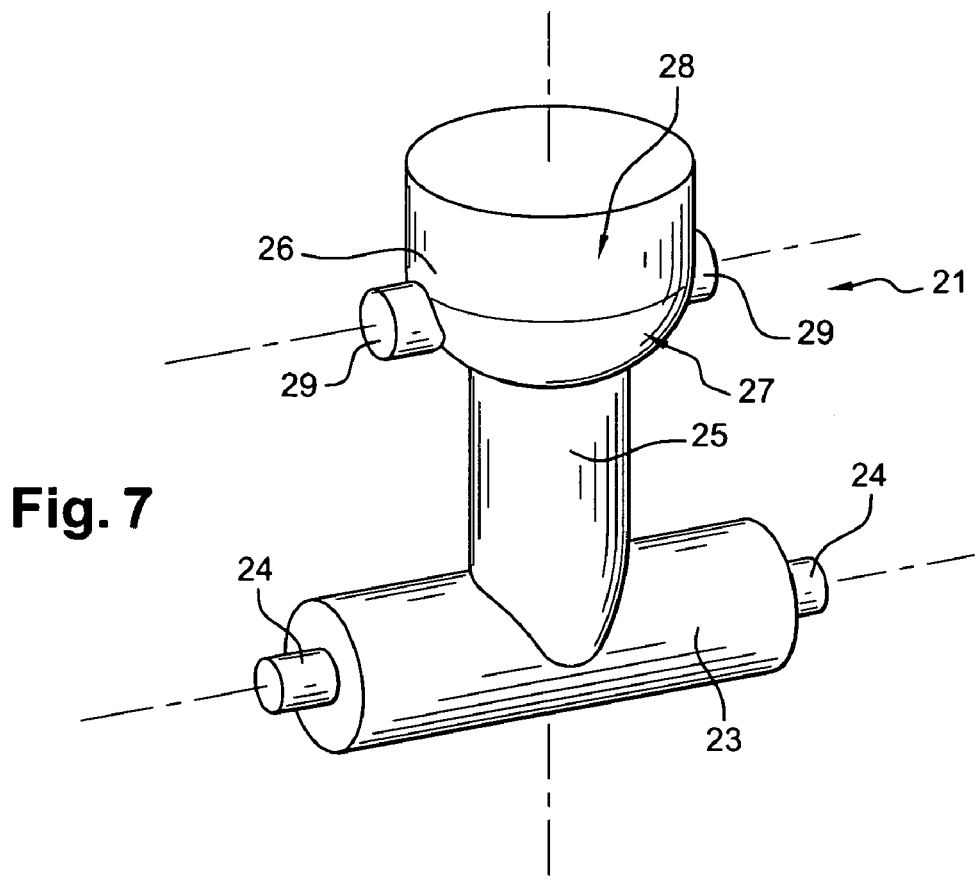
FIG. 7 is a perspective view of a tie that is part of the means for fastening the hatch.

Said means comprise a tie 21 shown in FIG. 7 and a support 22 shown in FIG. 6.

The tie is made up of a head 23 that is of cylindrical shape and that is provided at its ends with studs 24 which are comparable, both in shape and in relative positioning to the two studs 17 of the head 12b of the nozzle 12.

The head 23 is carried by a shank 25 which extends perpendicularly to the head 23 and terminates at a base 26.

The base 26 is itself subdivided into a spherical portion 27 which starts at the junction between the shank 25 and the base 26, and a cylindrical handle zone 28. In addition, the spherical portion 27 is provided with side bearing surfaces 29 in the form of cylinder portions that are parallel to the head 23, and whose function is described below.

Figure 8:
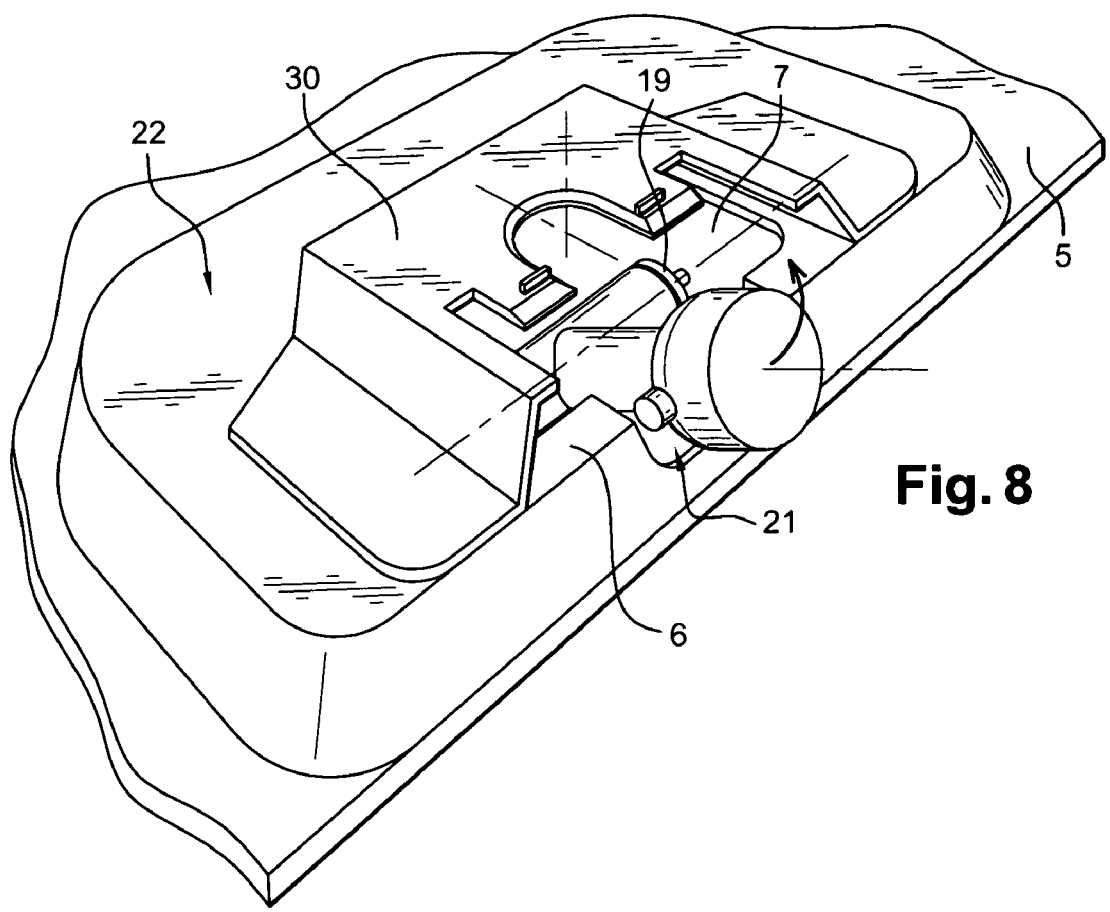
FIG. 8 is a view analogous to FIG. 3 showing the support in place on the bodywork part, and the tie in place on the hatch, the tie and the support not being coupled together.
Figure 9:
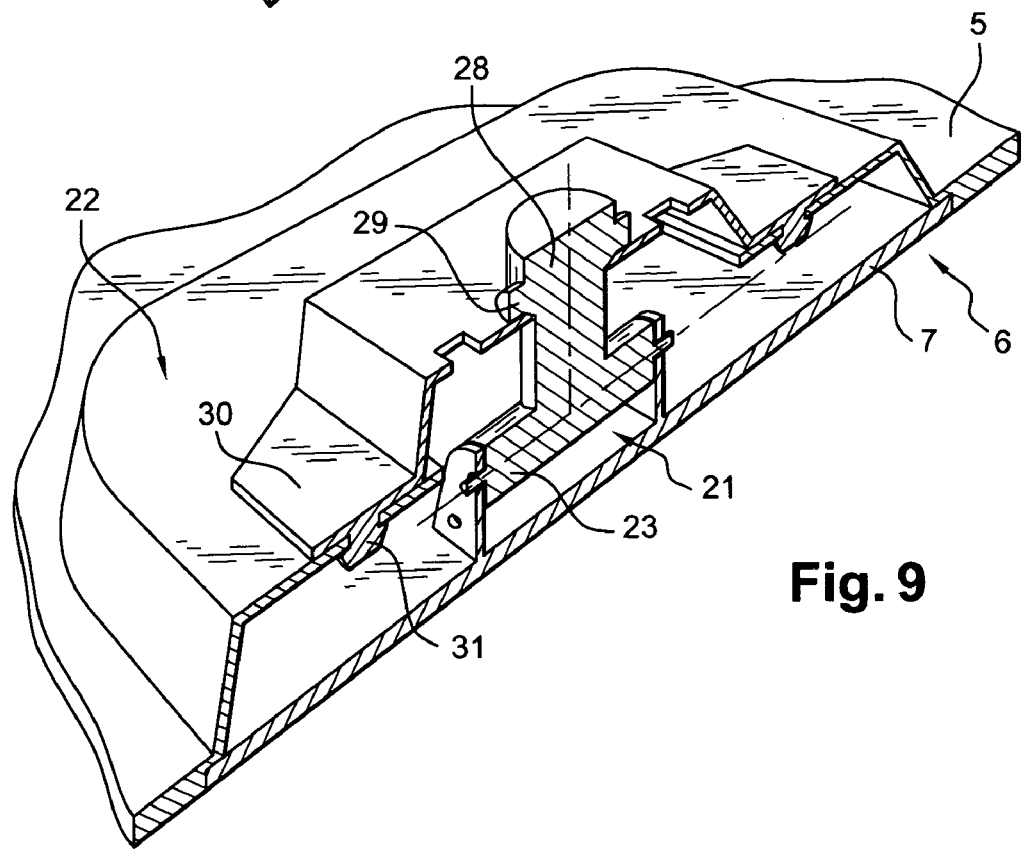
FIG. 9 is a view analogous to FIG. 8 and partially in section, showing the tie and the support as coupled together.

As can be seen clearly in FIGS. 8 and 9, the tie 21 is designed to be fastened to the hatch 7 by means of the studs 24 that constitute assembly means suitable for co-operating with the assembly means of the hatch that are constituted by the fastener ribs 19.

Thus, the coupling between the tie and the hatch forms a pivot whose axis coincides with the axis of the two studs 24. In addition, by leaving axial clearance between the head 23 and the two ribs 19, a second degree of freedom is offered to the hatch relative to the tie.

The support 22, shown in particular in FIG. 6, comprises a baseplate 30 provided with two positioning clips 31 suitable for snap-fastening into the clip holes 10 in the bodywork part 5 (see FIG. 2). Thus, the support 22 can be fastened to the bodywork part by using the same assembly means as used by the body of the nozzle.

As appears from the following description, said clips 31 do not support forces related to holding the hatch since such forces are transmitted directly by the baseplate bearing against the bodywork part. In other words, the baseplate constitutes a means of fastening the support 22 to the bodywork part.

The baseplate is bridge shaped, with a recessed central portion 32.

The recess formed in said portion 32 defines, firstly, a zone for flexing 33 which is disengaged from the baseplate by means of a side cutout 34. The flexing zone 33 is itself provided with a U-shaped cutout 35 defined by a conical edge 36 forming a seat for the spherical portion 27 of the tie.

The assembly made up of said seat 36 and of the spherical portion 27 of the tie constitutes ball-coupling means enabling the tie to be coupled to the support.

The free edge of the flexing zone 33 is beveled to constitute an engagement ramp 37 over which the two bearing surfaces 29 of the tie can slide, as explained below.

In addition, ribs 38 forming non-return abutments are provided in the vicinity of said engagement ramp 37, in a position such that once the coupling is achieved, the bearing surfaces 29 have been forced past the non-return abutments 38.

By observing FIGS. 8 and 9, it can be understood how this coupling takes place.

The tie being assembled to the hatch and the support being assembled to the bodywork part, the hatch is brought into the opening, and the handle zone of the tie passes through the opening and out onto the inside face of the bodywork part, in the passageway that is formed between the central portion 32 of the baseplate and a recess 40 provided for this purpose in the bodywork part.

Once in this position, shown in FIGS. 7 and 8, the tie, which is mounted to pivot relative to the hatch, can pivot to be coupled to the support.

During the coupling operation, the bearing surfaces 29 start by sliding over the engagement ramps 37.

By sliding in this way, they cause the flexing zone 33 to flex to a small extent, thereby putting the tie into traction and pressing the hatch against the bodywork part, or more precisely against the shoulders 14 provided in the bodywork part for positioning the hatch accurately.

The bearing surfaces 29 are then forced past the non-return abutments 38, and the spherical portion of the tie comes to be received on the conical seat 36 of the support, thereby providing a ball coupling between the tie and the support.

In this way, the hatch is positioned in the opening while being put under traction by the tie, as coupled to the support.

It can be seen that, by means of the invention, the hatch is held in its location by the fastener means that are constituted by the tie 21 and by the support 22, without it being necessary to provide any additional means on said hatch for securing it to a headlight washer device.

Thus, regardless of whether the vehicle is provided with a headlight washer device, no additional machining or other work needs to be performed on the hatch.

Naturally, the above-described embodiment is in no way limiting, and any desirable modification can be made to it without going beyond the ambit of the invention.

What is claimed is:

1. Fastener means for fastening a closure hatch to a bodywork part for the purpose of closing an opening which is provided in said bodywork part and from which a moving member constituted by a headlight washer nozzle can be caused to project, the closure hatch being provided with assembly means which serve to assemble it to the moving member, thereby constraining the hatch to move with the moving member between a closed position in which said hatch closes the opening while the moving member is retracted inside the opening, and an open position in which it uncovers the opening while the moving member is projecting from said opening, said fastener means include assembly means suitable for co-operating with the assembly means of the hatch for the purpose of securing the hatch to said fastener means, and securing means for securing said fastener means to the bodywork part, the fastener means holding the hatch on the bodywork part in the absence of the moving member.

2. Fastener means according to claim 1, constituted by a tie provided with the assembly means for being secured to the hatch, and by a support provided with the securing means for being secured to the bodywork part, the tie and the support being provided with coupling means arranged in a manner such that the tie transmits to the support the forces necessary for holding the hatch in the closed position.

3. Fastener means according to claim 1, in which, with the hatch being shaped to bear against an outside face of the bodywork part when said hatch is in the closed position, the fastener means bear against a face of the body work part that is opposite from its outside face.

4. Fastener means according to claim 1, dimensioned in a manner such as to exert on the hatch a force pressing it against the outside face of the bodywork part.

5. Fastener means according to claim 1, presenting elasticity in a direction substantially normal to the bodywork part in the vicinity of the opening, to an extent corresponding to any play that might result from expansion of the fastener means and possibly from expansion of the hatch and/or of the bodywork part and/or corresponding to creep in any of these items.

6. Fastener means according to claim 1, whose elasticity is procured by an elastically-deformable portion of the support.

7. Fastener means according to claim 6, in which the elastically-deformable portion of the support supports the coupling means for coupling to the tie.

8. Fastener means according to claim 1, including a ball coupling that enables the tie to hold the hatch in the opening without requiring it to be in any particular angular position.

9. Fastener means according to claim 8, in which the ball coupling is constituted by a spherical portion on the tie and by a frustoconical seat on the support.

10. Fastener means according to claim 2, in which the support and the tie are provided with a guide shape enabling them to couple together.

11. Fastener means according to claim 10, in which the guide shape comprises an engagement ramp whose inclination is such that, during the coupling, the tie moves closer to the support, thereby generating the force for pressing the hatch against the outside face of the bodywork part.

12. Fastener means according to claim 10, in which the guide shape further comprises non-return abutments for opposing uncoupling of the tie from the support.

13. Fastener means according to claim 12, in which the tie is provided with bearing surfaces arranged both to slide over the engagement ramp and to force past the non-return abutments.

14. Fastener means according to claim 1, in which the assembly means for assembling the hatch to the moving member and to the fastener means comprise fastener ribs suitable for co-operating with studs formed on the moving member and with studs formed on the fastener means.

15. An assembly comprising a hatch and fastener means according to claim 1 for fastening said hatch.

16. An assembly comprising a bodywork part, a moving member constituted by a headlight washer nozzle, a closure hatch for closing an opening which is provided in said bodywork part and from which said headlight washer nozzle can be caused to project, and fastener means for fastening the hatch to the bodywork part, in which assembly the closure hatch is provided with assembly means which serve to assemble it to the nozzle, thereby constraining the hatch to move with the nozzle between a closed position in which said hatch closes the opening while the nozzle is retracted inside the opening, and an open position in which it uncovers the opening while the nozzle is projecting from said opening, wherein the fastener means include assembly means suitable for co-operating with the assembly means of the hatch for the purpose of securing the hatch to said fastener means, and securing means for securing said fastener means to the bodywork part, the fastener means holding the hatch on the bodywork part in the absence of the nozzle.

* * * * *

UNITED STATES PATENT AND TRADEMARK OFFICE
CERTIFICATE OF CORRECTION

PATENT NO. : 7,168,752 B2  Page 1 of 1
APPLICATION NO. : 10/542389
DATED : January 30, 2007
INVENTOR(S) : Faicel Bourennane It is certified that error appears in the above-identified patent and that said Letters Patent is hereby corrected as shown below:

Title Page #73
Correct Assignee name and address: Compagnie Plastic Omnium,
Lyon, France Signed and Sealed this Third Day of April, 2007

JON W. DUDAS
*Director of the United States Patent and Trademark Office*